May 21, 1940.　　　L. F. POOCK　　　2,201,500
MACHINE TOOL
Filed July 26, 1937　　　3 Sheets-Sheet 1

INVENTOR
Louis F. Poock
BY
Maréchal + Noë
ATTORNEY

May 21, 1940.   L. F. POOCK   2,201,500
MACHINE TOOL
Filed July 26, 1937   3 Sheets-Sheet 2
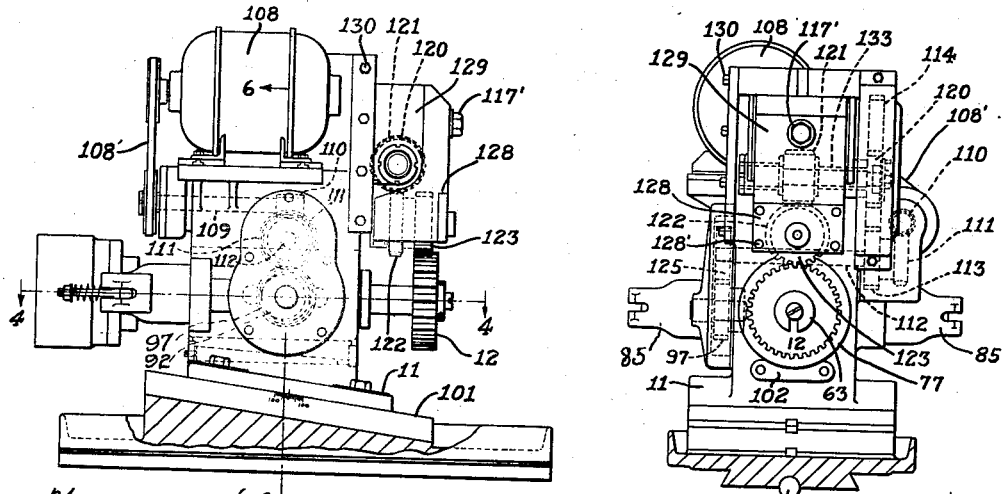
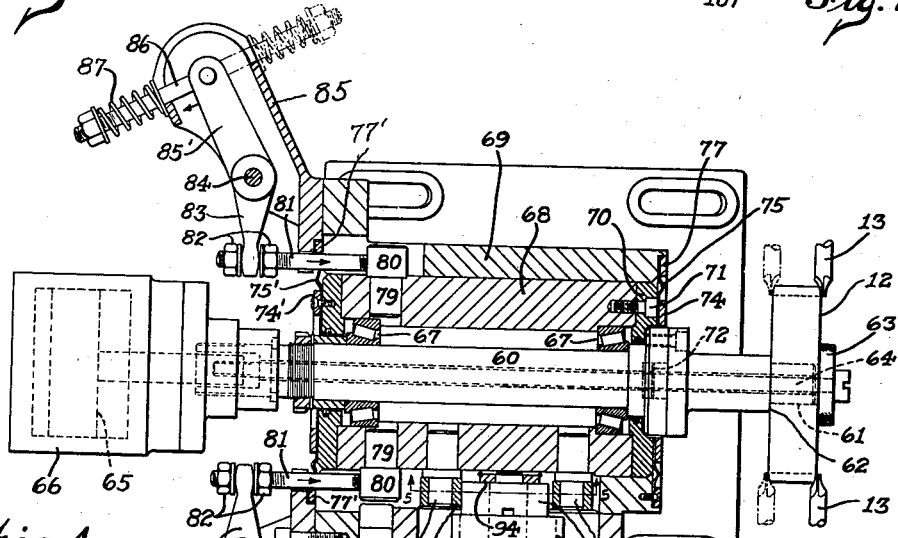
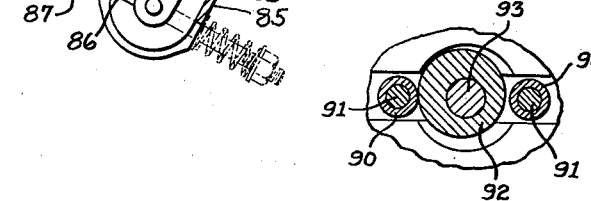
INVENTOR
Louis F. Poock
BY
Marichel & Noi
ATTORNEY

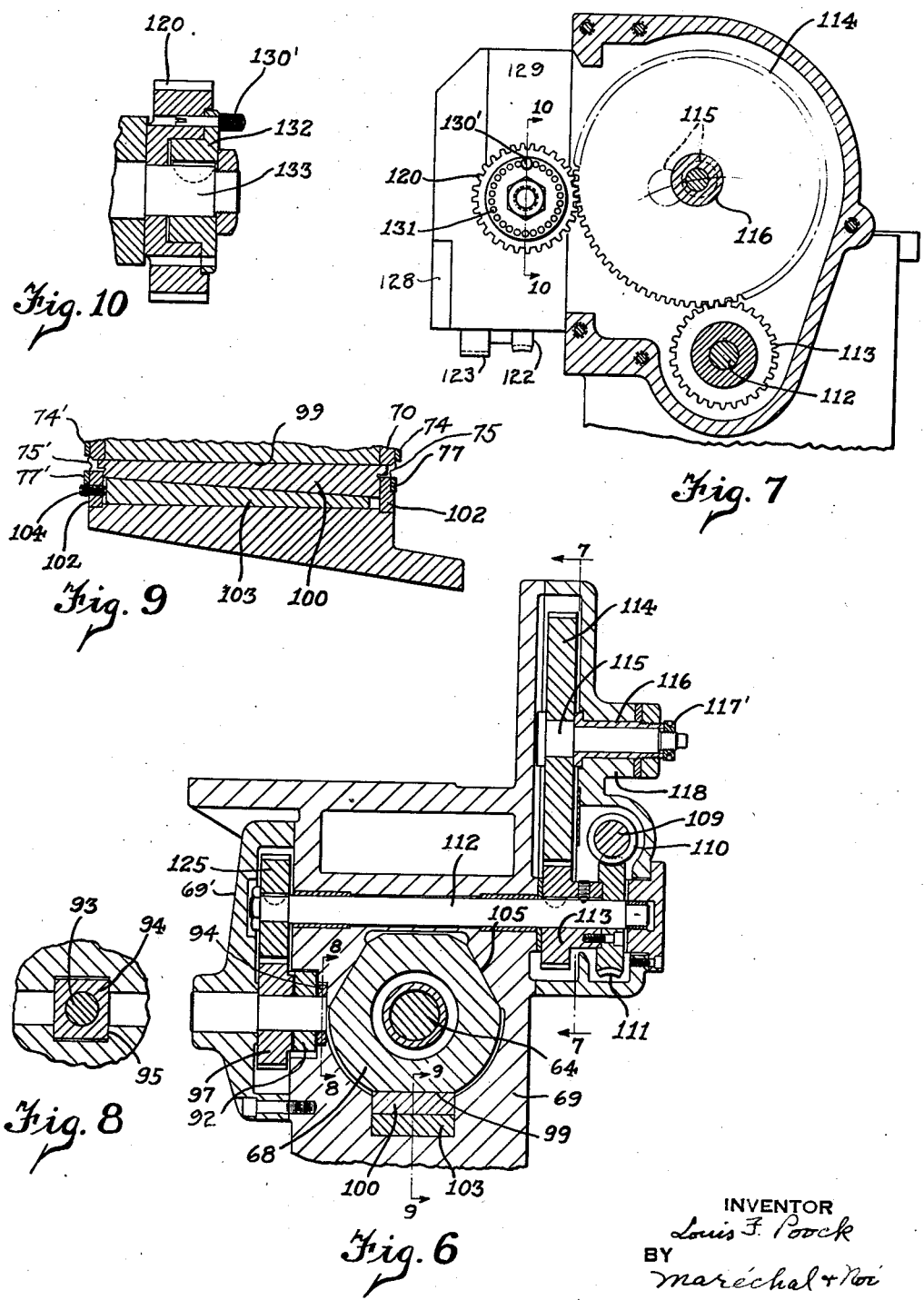

Patented May 21, 1940

2,201,500

UNITED STATES PATENT OFFICE 2,201,500

MACHINE TOOL

Louis F. Poock, Dayton, Ohio, assignor to The Cimatool Company, Dayton, Ohio, a corporation of Ohio Application July 26, 1937, Serial No. 155,612

9 Claims. (Cl. 90—1)

This invention relates to metal working machines for operating on gears and the like.

One object of the invention is the provision of a machine for shaping or chamfering the ends of gear teeth having provision for holding the gear being worked on and for moving the same axially and also rotatably in timed relation to its axial movements while the gear is engaged by a plurality of rotatable cutters which operate simultaneously on different teeth of the gear.

Another object of the invention is the provision of a machine of the character mentioned and provided with a plurality of cutter heads at opposite sides of the work supporting base, the cutter supporting heads being adjustably mounted for movement in a plurality of directions which enable the different cutters to be properly located with respect to a common gear or work piece with which they are both engaged.

Another object of the invention is the provision of a machine tool for shaping or chamfering the edges of gear teeth including a work support having provision for rotating the work and for simultaneously moving the work axially for engagement with a rotatable cutter which rotates about a stationary axis on the cutter head, the cutter head being supported adjustably for rotation about an axis which extends substantially parallel to the axis of the gear being worked upon to enable the cutter to be readily positioned with respect to the teeth of gears of different form.

Another object of the invention is the provision of a machine of the character above mentioned in which the cutters are moved axially into and out of operative position by means of a hydraulic cylinder and piston construction which interconnects the cutter head to a supporting frame and provides for rapid traversing movements of the cutter.

Another object of the invention is the provision of a machine of the character mentioned in which the work is moved axially and is supported for such movement upon a slide construction which enables any wear that may take place in the sliding parts to be readily taken up.

Another object of the invention is the provision of a machine of the character above mentioned having a work supporting arbor which is carried by an arbor support adapted for endwise sliding movement in a carrying base and in which pressures are equalized, and wear of the parts is reduced, and a very accurate control for the positioning of the work carrying arbor is provided for.

Other objects and advantages of the invention will be apparent from the following description, the appended claims, and the accompanying drawings, in which—

Fig. 2 is a front elevation of the work supporting base;

Fig. 3 is a side elevation of the work supporting base;

Fig. 4 is a horizontal section on the line 4—4 of Fig. 3;

Fig. 5 is a detail section taken on the line 5—5 of Fig. 4;

Fig. 6 is a section on the line 6—6 of Fig. 3;

Fig. 7 is a section through a portion of the work supporting base taken on the line 7—7 of Fig. 6;

Fig. 8 is a section on the line 8—8 of Fig. 6;

Fig. 9 is a section on the line 9—9 of Fig. 6; and

Fig. 10 is a section on the line 10—10 of Fig. 7.

Figure 1:
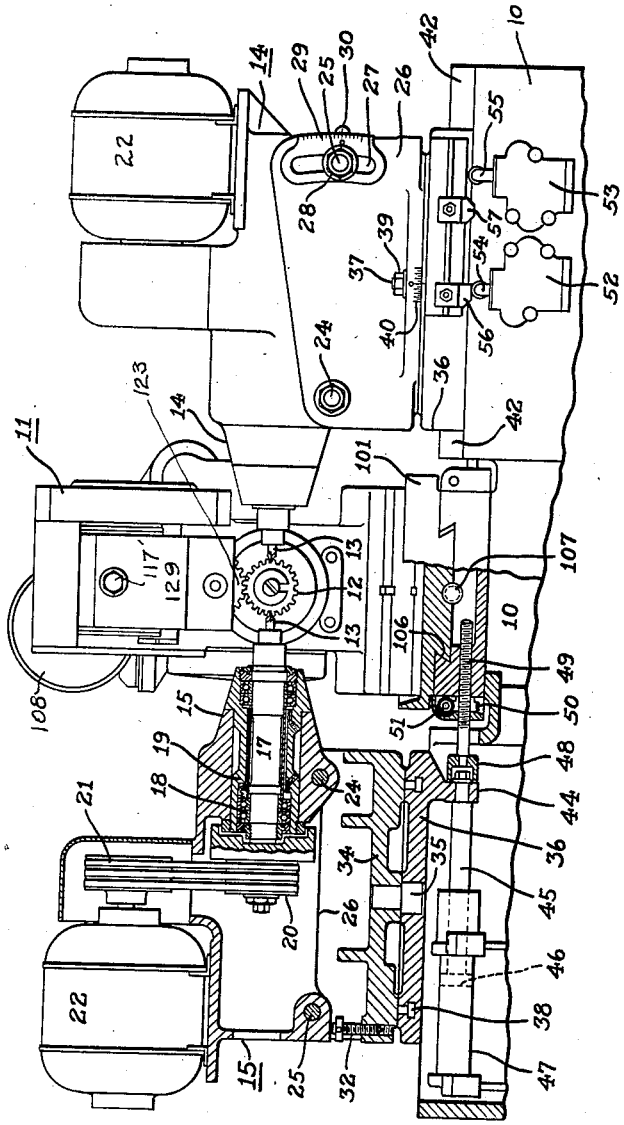
Fig. 1 is a side elevation of a machine embodying the present invention, and of the spindle heads being shown in central vertical section.

The machine as herein shown is one that is adapted to shape, round, burr, mill, chamfer, and the like, the lateral ends or edges of the teeth of gears so that the gears may be more readily placed in mesh, or so that the burrs on the edges of the teeth may be removed. The machine comprises a suitable frame 10 on which is a work supporting base designated generally by the reference numeral 11. This base is adapted to support a gear 12 the edges of which are to be removed or chamfered. These edges are shaped or chamfered by means of a rotating cutting tool or tools 13. At one side of the work supporting base is a cutter head 14 in which one of the tools 13 is rotatably mounted, this cutter head being suitably positioned on the frame 10 so that the tool rotates on an axis which is angularly related to the axis of the gear. While the machine may have only a single cutter, as herein shown there are two cutter heads, the second cutter head 15 being provided on the frame 10 at the opposite side of the base 11 so that the two tools operate simultaneously on a common work piece and at opposite sides of the work piece and in such relation as to balance forces on the gear and the gear carrying parts.

Each tool 13 may have a suitable form in accordance with the desired shape of the cut, and may have cutting edges arranged either internally or externally, but as herein shown as in Fig. 4, for example, the cutting tool is what is termed a "pencil" cutter that is provided with external cutting teeth suitably curved so as to chip away the edges of the teeth of the gear as the cutter rotates. The cutter which is mounted in the cutter head 15 is carried by a suitable spindle 17 mounted preferably by anti-friction bearings 18 so as to rotate freely in a hollow carrier 19 which is removably secured in the cutter head. The space between the carrier 19 and the spindle 17 may be packed with suitable lubricant. One end of the spindle 17 projects towards the left as shown in Fig. 1 and carries the drive pulley 20 which is operated by a belt 21 driven by an electric motor 22. The two cutter heads 14 and 15 are of similar construction. Each is mounted for pivotal adjustment about a transverse axis indicated at 24. Studs 25, one of which is shown fixed on the cutter head 14, project laterally through side walls 26 which are slotted as indicated at 27 so that the studs 25 may be raised and lowered when the fastening nuts 28 are loosened, thus tilting the cutter head about a horizontal axis which extends substantially parallel to the gear or work axis. Indicating marks 29 provided on the walls 26 cooperate with a projection 30 extending adjacent thereto from the cutter head so that the angle of tilt of the cutter spindles may be readily determined. The cutter heads are tilted or located preferably by means of jack screws 32 which can be rotated by means of a spanner wrench when the securing nuts 28 are loosened.

The walls 26 on which a cutter head is pivotally supported extend below the cutter head as indicated by the wall portion 34 and this wall portion is rotatably adjustable by means of a pivot pin 35 to a slide member 36. Studs 37 extend through holes in the wall portion 34 and are provided with heads at their lower ends which move in a circular slot 38 in member 36, of inverted T form as shown in Fig. 1 so that the cutter head may be moved about a vertical axis extending transversely of the cutter spindle. When the nuts 39 on the studs 37 are tightened after the proper location of the spindle axis is determined, the wall portion 34 and the slide 36 are secured rigidly to one another. A scale 40 is preferably provided on the side of the wall portion 34 to indicate the angularity between the spindle axis and the axis of the gear.

Each of the two slides 36 is reciprocably mounted on guideways 42 so that the cutter heads can be moved towards the gear and away from the gear, and to effect this movement and permit of rapid traverse of the tool into and out of cutting position each slide 36 is connected to the frame 10 by means of a hydraulic piston and cylinder construction. As shown the slide 36 is provided with a downward extension 44 to which is fixed the piston rod 45 having a piston 46 operating in the cylinder 47, the latter being secured to the frame 10. When hydraulic pressure is applied to the left hand end of the cylinder of the cutter head 15 its piston is moved to the right and the slide 36 is brought up against an adjustable stop 48 to thus determine the operative position of the tool. The stop 48 is carried by a threaded stud 49 which is moved axially by means of a nut 50 having worm teeth on its outer side engageable with an operating worm member 51 which may be turned in a suitable manner for adjustment of the stop 48. The supply of fluid pressure to the cylinders 47 is controlled by hydraulic valves 52 and 53 for each cutter head, these valves having valve members 54 and 55 respectively which are operated automatically by the stop 56 controlling the valve member 54 and a lug 57 which controls the valve member 55. The latter determines the extent of retracting movement of the cutter head by depressing the valve member 55 when the slide member 36 to which the lug is fixed is moved sufficiently far to retract the cutter from in front of the gear being operated on. The hydraulic valves 52 for the two cutter heads are controlled manually by a suitable control lever, not shown, to move the cutters inwardly until the valve members 54 are depressed by the stopping stops 56 which reduce the speed of movement up to the time the head carrying slides engage the positive stops 48. Thus the tools are moved in opposite directions transverse of the spindle axis. During cutting operations however, it will be understood that the spindle axis is stationary and in accordance with the preferred construction of the invention it will also be understood that the cutter itself does not move bodily during the cutting operation but the relative movements of the gear and the cutter are effected by moving the gear itself.

The two cutting spindles preferably operate in reverse directions so that tools of identical form may be used in both spindles. And with the tools extending so that their axes are substantially parallel to one another and transverse to the gear axis and with both of the cutters operating on opposite sides of a common gear, as shown in Fig. 4 for example, it will be understood that biasing and twisting forces on the work carrying structure are to a large extent balanced one with respect to the other.

Referring now more particularly to Figs. 2, 3, 4 and 6, the gear 12 to be chamfered, or on which the burrs at the edges of the teeth are to be removed, is detachably carried on an arbor 60 which has a cylindrical gear carrying projection 61 and a shoulder 62 against which the side of the gear is forced by means of the holding plate 63 which is mounted on a rod 64, the latter extending through a passage in the arbor 60 and having a piston 65 at its opposite end. This piston operates in a cylinder 66 which is supplied with fluid pressure such as air or hydraulic pressure at its inner end so as to hold the rod 64 in its retracted position, the pressure being released to permit release of the rod so that the gear can be removed and another gear placed in position.

The spindle 60 is rotatably mounted preferably by means of antifriction bearings 67 in arbor support 68. This arbor support is slidably mounted in the body portion 69 of the work supporting base 11 so that it may be moved in the direction of the axis of the work to carry the work into and out of engagement with the cutting tools in timed relation with the rotation of the gear itself which is imparted by mechanism as will be described. At one end of the arbor support the latter is provided with an end plate 70 held in place by attaching screws 71 and providing a channel in which a lubricant sealing strip 72 is retained. Fixed to the end plate 70 is a clamp ring 74 which holds the inner edge of a flexible disk 75 of leather or other suitable flexible material to the outer surface of the plate 70. The outer or rim portion of the flexible disk 75 is retained between a metal ring 77 and body portion 69 to which it is screwed. The inner and outer circular edges of the flexible disk 75 are thus secured tightly respectively to the arbor support and to the stationary body portion of the work supporting base, retaining lubricant and preventing the metal chips removed from the gear teeth from finding their way into the moving parts during the reciprocating and rotating movements of the arbor.

At the opposite end of the arbor support there is a similar flexible disk 75' held by a ring 74' and ring 77' to prevent the loss of lubricant from the lubricant chamber in which the antifriction bearings are located, and to prevent foreign matter from finding its way into the lubricant chamber.

Projecting oppositely from the arbor support 68 are a pair of pins or studs 79 having heads 80 fixed to rods 81 which are provided with nuts 82. Between a pair of nuts 82 on each rod is a spring pressed lever 83, pivotally mounted at 84 on a bracket 85. The other end of lever 83 is pivotally connected to a post 86, a spring 87 being arranged on this post and operating to yieldingly urge the arm 85 in the direction of the arrow shown in Fig. 4, thus yieldingly urging the arbor support towards the right as viewed in that figure so that the pressure of the tools 13 created on the gear 12 will be taken by the springs 87. Both of the rods 81 are similarly connected to the spring devices of the character described. The springs 87 may be swung around to a reversed position, indicated in Fig. 4 in dotted lines to urge the arbor support in the opposite direction, since the studs 86 can move through a 180° travel, if it should be desired to so arrange the machine that the pressure created by the tools on the gear 12 should be taken directly by the positive control for the arbor support instead of by the springs, or to provide for cutting of the opposite sides of the gear teeth when the tools are arranged in the dotted line position shown in Fig. 4.

Means are provided for positively moving the arbor support 68 in an endwise direction, this means including rollers 90 carried by studs 91 which project laterally from the arbor support, these rollers 90 being arranged at opposite sides of a cam 92 which is rotatably carried on a stub shaft 93 journalled at its outer end in a bracket 69' on the body portion. An additional journal support for the inner end of the stub shaft is provided by a supporting block 94 shown more clearly in Fig. 8. This supporting block is restrained against lateral movements by means of slide surfaces 95 although some small vertical play is preferably permitted so that the position of the shaft 93 may be vertically adjusted to compensate for wear. The shaft 93 is rotated by means of a gear 97 which is fixed to the cam 92, and as the cam moves in a continuous rotary motion it will be seen that the arbor support is moved back and forth through such distances and at such speeds as determined by the shape of the cam, which is so designed, in accordance with the preferred embodiment of the invention as herein illustrated, that as the gear rotates at a uniform speed it will periodically be pushed back and forth axially to bring the edges of the gear teeth successively into engagement with a cutting tool so that the edges are suitably rounded to provide for easy meshing of the gear with another gear. The springs 87 act to hold one of the rollers 90 yieldingly engaged with the cam during operation, the distance across the cam being slightly less than the distance between the rollers 90.

The arbor support 68 as shown in Fig. 6 is provided with a slide surface 99 which operates on a slide block 100 provided below the arbor support and mounted for vertical movement between horizontally extending straps 102 provided in fixed positions at the opposite ends of the body portion 69. Below the slide block 100 is an adjusting wedge 103 which may be moved toward the right or left as illustrated in Fig. 9 under the control of an adjusting screw 104 in order to raise or lower the slide block 100 and thus take up any wear that may exist between the arbor support and the body portion, and hold the arbor support slidably against flat guide surfaces 105 on the body member. The longitudinal axis of the arbor support is thus very definitely located and any lost motion or play in its guided movements are eliminated.

The position of the work supporting base may be raised or lowered, as it is mounted adjustably on an inclined slide 101, see Fig. 3. The slide 101 may be moved in the direction of the arbor axis as it is guided in horizontal ways 106 provided in the frame 10. A manually controlled operating screw 107, see Fig. 1, provides for advancing and retracting movements of the entire work supporting base, and may be operated to change the gear location for coacting with tools located as shown in either solid or dotted lines in Fig. 4.

The rotational movement of the work carrying arbor, and consequently of the gear 12 is effected from an electric motor 108 which is connected through a belt 108' to rotatable shaft 109 which carries a worm 110. The latter meshes with a worm wheel 111 which is supported on a shaft 112 and which is fixed to a spur gear 113. This spur gear engages a large idler 114 which is rotatably carried on stud 115. The idler 114 meshes with a spur gear 120 fixed to shaft 133 which also carries a worm 121. This worm turns worm wheel 122 which is fixed to a turning gear 123 that is in meshing engagement with the gear 12 being worked on. By means of this train of gearing the motor 108 causes a uniform rotation of the work gear 12, and as the gear 12 is of sufficient width it will maintain its meshing engagement with the gear 123 that operates it in spite of the reciprocatory movements of the work gear during the cutting operation.

The worm gear 122 has the same number of teeth as the teeth on the gear 12 so that one rotation of the worm 120 moves the gear 12 one tooth, and during this one tooth rotation of the gear 12 the latter is moved endwise by means of operating mechanism which is shown in Figs. 2 and 6. The shaft 112 which carries the gear 113 which drives the work gear rotationally also carries a gear 125 which meshes with the cam driving gear 97 so that the cam produces oscillatory movement of the arbor support 68 in order that the gear 12 will be moved endwise during the time that the cutter 13 is operating on any tooth, for the particular construction herein illustrated in which the gear is cut as it rotates. The gears 125 and 97 are of the same pitch diameter and one rotation of shaft 112 therefore produces one oscillation of the work supporting arbor each time the gear 12 is rotated through one tooth space.

When a gear 12 having a different pitch distance between teeth is to be cut, it is merely necessary to replace the gear 122 with one having the same pitch and helix angle as the gear to be operated on, and to replace the cam itself to produce a proper timed movement of the work as the work rotates. The cam may be very readily removed because the end bracket 69' of the work supporting base is detachably mounted and is preferably doweled so as to have an exact location with respect to the body portion 69. The gear cluster containing gears 122 and 123 is also readily removable as the supporting shaft on which these gears are carried is held in place by a removable front plate 128, secured by attaching screws 128'. When a larger or smaller gear 122 replaces the one shown, in order to maintain a proper meshing engagement between gear 122 and its driving worm 121, the latter may be raised or lowered as it is mounted on a vertically adjustable bracket 129, held in proper position by bolts 130. As the worm 121 is raised or lowered, the position of the spur gear 120 which engages the idler 114 is of course raised and lowered with it, but the idler gear may be readily swung about the center of the shaft 112 in order to maintain the proper meshing engagement with the gear which it operates. The stud 115 which rotatably supports the idler may be adjusted eccentrically to compensate for any wear, being eccentrically mounted in an adjusting sleeve 116 which can be turned with respect to the stud 115 and then held in adjusted position by lock bolt 117'. The idler gear 114 may be swung bodily around the center of the gear 113 as the sleeve 116 extends through an arcuate slot in the boss 118 of the work supporting base. The stud 115 may thus be moved from the position shown in full lines in Fig. 7 to the position shown by dotted lines, or to intermediate positions.

In setting up the machine for any particular gear to be operated on, it is of course necessary to properly time the endwise movement of the gear with its rotational movement so that the tooth of the gear being worked on is moved farthest into the tool when the tool is located between adjacent teeth, and to effect this initial timing, the gear 120 may be set in any position on its carrying stud 133 with respect to the worm 121 by means of a locking device including a pin 130' which may be selectively positioned in a series of holes 131 provided in the flanged member 132 which is keyed to the shaft 133 on which the worm is mounted, and the gear 120 is also provided with a slightly different number of holes to provide a vernier adjustment between flanged member 132 and gear 120, the inner end of the pin 130' serving to lock the gear 120 on the shaft.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine for shaping the ends of gear teeth comprising a frame, a work supporting base on said frame, a work carrying member reciprocally mounted on said base, rotatable cam means for reciprocating said member in said base at irregular speeds of movement, means for turning said member in said base at a substantially constant speed of rotation during its reciprocating movements and in timed relation to its reciprocating movements, a plurality of cutter heads on said frame one at each side of said base, a pair of similar cutters one mounted in each of said heads for rotation about their respective axes and adapted to simultaneously and similarly shape tooth ends on opposite sides of the axis of a work piece on said work carrying member, the axes of rotation of said cutters being substantially parallel to one another and transverse to the axis of the gear being worked on, and means for relatively adjusting the axes of rotation of the cutters for simultaneous and similar engagement of the cutters with the advancing parts of two tooth ends located on opposite sides of the axis of the work piece at the same end of the gear.

2. A machine for shaping the ends of gear teeth comprising a frame, a work supporting base on said frame, a work carrying member reciprocally mounted on said base, means for reciprocating said member, means for turning said member in timed relation to its reciprocating movements, a cutter head on said frame, a cutter mounted in said head for rotation about an axis which extends at a large angle to the work axis and substantially in the same plane as the work axis and adapted to shape the tooth ends on a work piece on said work carrying member, means adjustably mounting said head on the frame for rotation about an axis extending parallel to the work axis and transversely of the cutter axis, and means adjustably mounting said head for rotation about a second axis extending transversely of the cutter axis and transversely to the work axis.

3. A machine for shaping the ends of gear teeth comprising a frame, a work supporting base, a slide inclined with respect to a horizontal plane supporting said base for movement on said frame at an angle to the work axis, a work carrying member reciprocally mounted on said base for movement in a horizontal plane, means for reciprocating said member in said base at irregular speeds of movement, means for turning said member in said base at a substantially constant speed of rotation in timed relation to its reciprocating movements, a cutter head on said frame, a cutter mounted in said head for rotation about a stationary axis which extends substantially transversely of the work axis and shaped to shape the tooth ends on a work piece on said work carrying member.

4. A machine for shaping the ends of gear teeth comprising a frame, a work supporting base on said frame, a work carrying arbor, an arbor support, a slide block on said base on which the arbor support is reciprocably slidable, means for adjusting the position of said slide block towards and from said arbor support, a rotatable cam means for reciprocating said arbor support in said base at irregular speeds of movement, means for turning the arbor in said arbor support at a substantially constant speed of rotation and in timed relation to its reciprocating movements, a cutter head on said frame, a cutter mounted in said head for rotation about its own axis and adapted to shape the tooth ends on a work piece on said work carrying member.

5. A machine for shaping the ends of gear teeth comprising a frame, a work supporting base on said frame, a work carrying arbor, an arbor support, a slide block on said base below the arbor support on which the arbor support is reciprocably slidable, means for adjusting the position of said slide block towards and from the arbor support, rotatable cam means at one side of the arbor support for reciprocating said arbor support in said base at irregular speeds of movement, gear means engageable with the work being cut for turning the arbor in said arbor support at a substantially constant speed of rotation and in timed relation with respect to its reciprocating movements, a cutter head on said frame, a cutter mounted in said head for rotation about its own axis and adapted to shape the tooth ends on a work piece on said work carrying member.

6. A machine for shaping the ends of gear teeth comprising a frame, a work supporting base on said frame, a work carrying arbor, an arbor support reciprocally mounted on said base, bearing means between the arbor support and the arbor for rotatably supporting the arbor, means for reciprocating said arbor support, means for turning the arbor in timed relation to its reciprocating movements, a flexible sealing member having an inner edge connected to the arbor support and an outer edge connected to the work supporting base and shielding the bearing means, a cutter head on said frame, a cutter mounted in said head for rotation about a central axis and dapted to shape the tooth ends on a work piece on said work carrying member.

7. A machine for shaping the ends of gear teeth comprising a frame, a work supporting base on said frame, a work carrying arbor, an arbor support reciprocally mounted on said base, bearing means between the arbor support and the arbor for rotatably supporting the arbor, means for reciprocating said arbor support on the work supporting base, means for turning the arbor in timed relation to its reciprocating movements, a flexible sealing disk having an inner edge connected to the arbor support and an outer edge connected to the work supporting base and shielding the bearing means adjacent the work supporting end of the arbor, a cutter head on said frame, a cutter mounted in said head for rotation about a central axis and adapted to shape the tooth ends on a work piece on said work carrying member.

8. A machine for shaping the ends of gear teeth comprising a frame, a work supporting base on said frame, a work carrying arbor, an arbor support rotatably supporting said arbor, guide means on said base slidably supporting the arbor support for reciprocatory movement in the direction of the arbor axis, rotatable cam means for reciprocating said arbor support in said base at irregular speeds of movement, rotatable gear means for turning said arbor in said arbor support at a substantially constant speed of rotation and in timed relation to its reciprocating movements, a common drive means for said rotatable cam means and said rotatable gear means, a plurality of springs symmetrically connected to opposed portions of said arbor support for urging said arbor support in one direction to maintain the cam means in engagement with the arbor support, a cutter head on said frame, and a cutter supported in said cutter head for rotation about an axis extending substantially transversely of the axis of the work piece and adapted to shape the tooth ends on a work piece on said arbor.

9. A machine for shaping the ends of gear teeth comprising a frame, a work supporting base on said frame, a work carrying arbor, an arbor support rotatably supporting said arbor, guide means on said base slidably supporting the arbor support for reciprocatory movement in said base in the direction of the arbor axis, rotatable cam means for reciprocating said arbor support in said base at irregular speeds of movement, rotatable gear means for turning said arbor in said arbor support at a substantially constant speed of rotation during its reciprocating movement and in timed relation to its reciprocating movements, a common drive shaft operably connected to and rotating said rotatable cam means and said rotatable gear means, a plurality of springs symmetrically connected to opposed portions of said arbor support for urging said arbor support in one direction to maintain the cam means in engagement with the arbor support, means supporting said springs for reversibly mounting to urge the arbor support in the other direction, a cutter head on said frame, and a cutter supported in said cutter head for rotation about an axis extending substantially transversely of the axis of the work piece and adapted to shape the tooth ends on a work piece on said arbor.

LOUIS F. POOCK.

CERTIFICATE OF CORRECTION.

Patent No. 2,201,500. May 21, 1940.

LOUIS F. POOCK.

It is hereby certified that error appears in the printed specification of the above numbered patent requiring correction as follows: Page 1, second column, line 5, for "and of" read --one of--; page 4, second column, line 42, claim 3, for "shaped to shape" read --adapted to shape--; page 5, first column, line 18, claim 6, for "dapted" read --adapted--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.